US006133515A

United States Patent [19]

Hoshino

[11] Patent Number: 6,133,515
[45] Date of Patent: Oct. 17, 2000

[54] STRUCTURE OF A GUITAR BRIDGE

[75] Inventor: Yoshihiro Hoshino, Nagoya, Japan

[73] Assignee: Hoshino Gakki Co., Ltd., Japan

[21] Appl. No.: 09/370,415

[22] Filed: Aug. 9, 1999

[30] Foreign Application Priority Data

Jan. 20, 1999 [JP] Japan .................................. 11-012037

[51] Int. Cl.$^{7}$ ........................................................ G01D 3/04
[52] U.S. Cl. .................................. 84/307; 84/298; 84/304
[58] Field of Search .............................. 84/290, 298, 299, 84/307, 308, 309, 267

[56] References Cited

U.S. PATENT DOCUMENTS

| | | | |
|---|---|---|---|
| Re. 36,484 | 1/2000 | Turner | 84/297 R |
| 4,712,463 | 12/1987 | Kubicki et al. | 84/304 |
| 4,960,027 | 10/1990 | Dunwoodie | 84/307 |
| 5,277,094 | 1/1994 | Spuler | 84/298 |
| 5,537,907 | 7/1996 | Rose | 84/298 |
| 6,034,311 | 3/2000 | Fisher, IV | 84/313 |

*Primary Examiner*—Paul Ip
*Assistant Examiner*—Kimberly Lockett
*Attorney, Agent, or Firm*—Ostrolenk, Faber, Gerb & Soffen, LLP

[57] ABSTRACT

A guitar bridge capable of reducing the shifting in the holding position of the guitar strings due to the tilting of the individual string saddles. The guitar bridge has string-receivers for each of the guitar strings on the bridge main body. Each saddle is held by the bridge main body to be freely movable in forward and rearward and in the up and down directions through a front and back adjustment screw that is inserted into the screw holder of the bridge main body and through two up and down adjusting screws that are screwed into the saddle and touch the guitar body. The sides of the saddle are curved surfaces in the up and down direction. The sides contact an adjacent surface, so that the saddle rotates about a longitudinal axis parallel to the string rather than shifting the respective string laterally with respect to others.

12 Claims, 13 Drawing Sheets

STRUCTURE OF A GUITAR BRIDGE

BACKGROUND OF THE INVENTION

1. Field of the Invention

The present invention relates to the structure of a guitar bridge.

2. Description of the Related Art

Referring initially to FIG. 12, a known guitar 50 is shown as an electric guitar or a bass guitar, for example. Each guitar string 51 extends between a tuning bolt or peg 53 disposed on an elongate neck 52 and a guitar bridge 60 arranged on a guitar body 54.

In FIGS. 13 and 14, a guitar bridge 60 known in the prior art supports a plurality of saddles 71 each having a string receiver part 72 for a respective guitar string 51 to pass over. The saddles 71 are supported on a main body 61 of the bridge. The body 61 has a cross section in the shape of an L, for instance, as shown in FIG. 14. Saddle 71 is held by the bridge main body 61 to be freely movable forward and back by rotation of an adjusting screw 73. The adjusting screw 73 is inserted into a screw holder 62 of the bridge main body 61.

A lower portion of the saddle 71 is held to the bridge main body 61 in a freely movable manner through two up and down adjusting screws 75 and 76. Screws 75 and 76 are located on opposite lateral ends of the saddle 71 and contact the upper surface of the bridge main body 61.

A coil spring 74 biases against the saddle 71. Its tension is adjusted by a front and back adjustment screw 73. A modified bridge in which the bridge main body is separate and independent for each guitar string (see FIG. 1) is also known in the prior art.

In the prior art guitar bridge 60 (FIGS. 12–14), the string height and string length for each guitar string 51 can be adjusted by suitable rotation of the front and back adjusting screw 73 and of the up and down adjusting screws 75 and 76, respectively.

The prior art bridge, however, is disadvantageous because the position of the string receiving part 72 or the holding position of each guitar string 51 can shift in the width or lateral direction Z of the saddle 71 (see FIGS. 15A and 15B). That shift changes the pitch (distance) P between adjacent guitar strings 51, as compared with the designed in value. Also, performance is affected when the saddle 71 is tilted, such as when the adjusted lengths of adjusting screws 75 and 76 are different as shown in FIG. 15B.

In addition, where a plurality of saddles 71 are arranged adjacent each other on one bridge main body 61, as shown in FIG. 15, the minimum design pitch between the strings is limited to the distance between the string receiving parts 72 of the adjoining saddles 71, or the entire width of the saddle 71 itself.

FIG. 15A shows the adjusting screws 75 and 76 adjusted so that their lengths are even. Where a plurality of saddles 71 are arranged adjacent to each other on one single bridge main body 61, as described above, shifting of the positions of the guitar strings 51 tends to become greater because adjacent saddles 71 tend to contact each other and develop mutual interference, especially when the saddles have been tilted as described above in connection with FIG. 15B.

Referring to FIG. 16, it is known to eliminate problems caused by mutual interference of adjacent saddles by reducing the entire width of each saddle 91. Also, horizontal shift preventing grooves 85 and 86 receive a pair of up and down adjusting screws 95 and 96, at the right and at the left, respectively, on top of the main bridge body 81. This design prevents adjoining saddles 91 from interfering with each other even when the saddles 91 have been tilted, as shown in the guitar bridge in FIG. 16. Although this makes it possible to substantially avoid the mutual interference among the saddles 91 themselves, the shifting of the holding positions of the guitar strings 51 becomes more significant because the saddles 91 are tilted while the up and down adjusting screws 95 and 96 are held in the grooves 85 and 86.

SUMMARY OF THE INVENTION

The present invention overcomes the above problems in the prior art by providing a guitar bridge which is capable of reducing shifting in the holding positions of guitar strings upon tilting of their saddles.

The invention provides a guitar bridge which supports a respective saddle for each guitar string on the bridge main body. The saddle is held on the bridge main body to be freely movable in the forward and rearward directions through an adjusting screw that has been inserted into a screw holder of the bridge main body. Also, two up and down adjusting screws are screwed into the saddle at laterally separated positions and contact the bridge main body.

At least one and preferably both lateral sides of the saddle is advantageously a curved surface in the up and down directions, i.e. at least curved around a longitudinal axis parallel to the respective guitar strings. Moreover, the curved surface on the side of the saddle comprises an arcuate portion of a circle having a center on a straight line that connects the string receiver on the bridge main body and the front and back adjusting screw in the up and down direction. Adjacent lateral sides of adjacent saddles contact each other. But, their curvatures avoid one saddle tilting its neighbor. In a preferred embodiment, the guitar bridge main body includes a wall that is in constant contact with the curved surface on the side of the saddle.

Other objects and features of the invention are explained below with reference to the attached drawings.

DETAILED DESCRIPTION OF THE PREFERRED EMBODIMENTS

Figure 1:
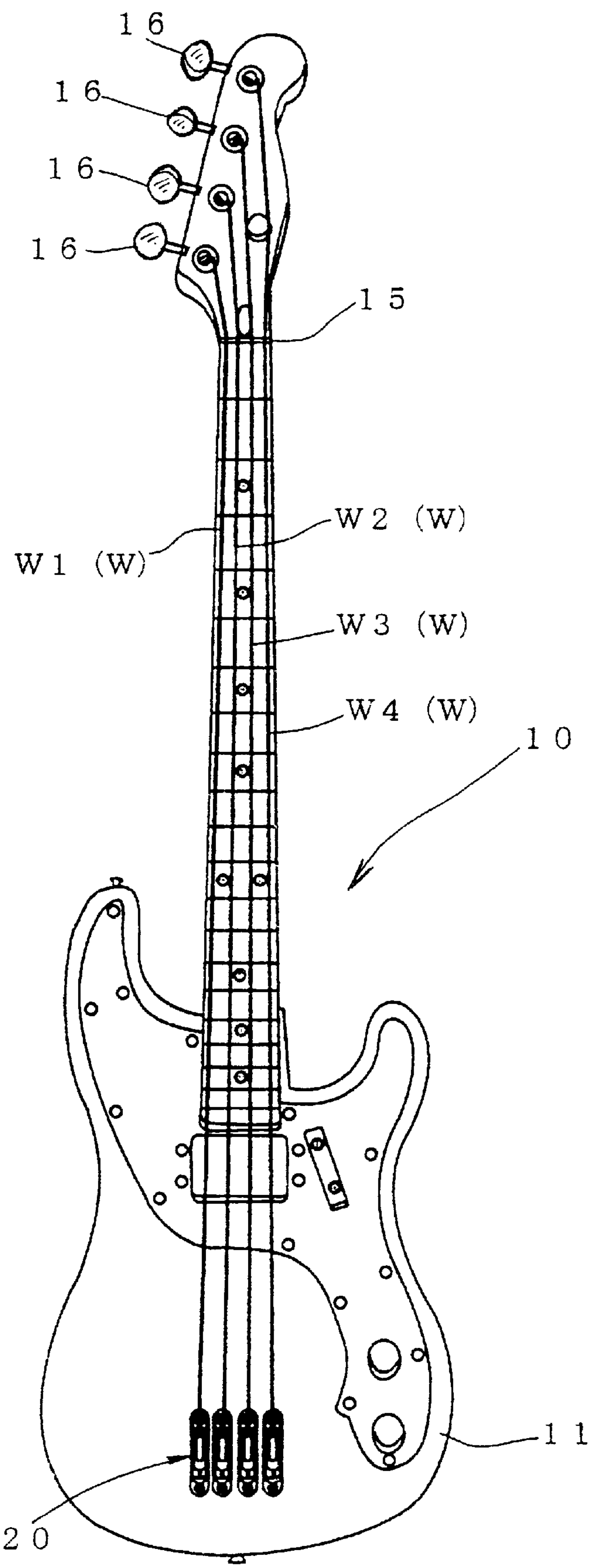
FIG. 1 shows an entire guitar which is equipped with a guitar bridge according to a preferred embodiment of the present invention.
Figure 2:
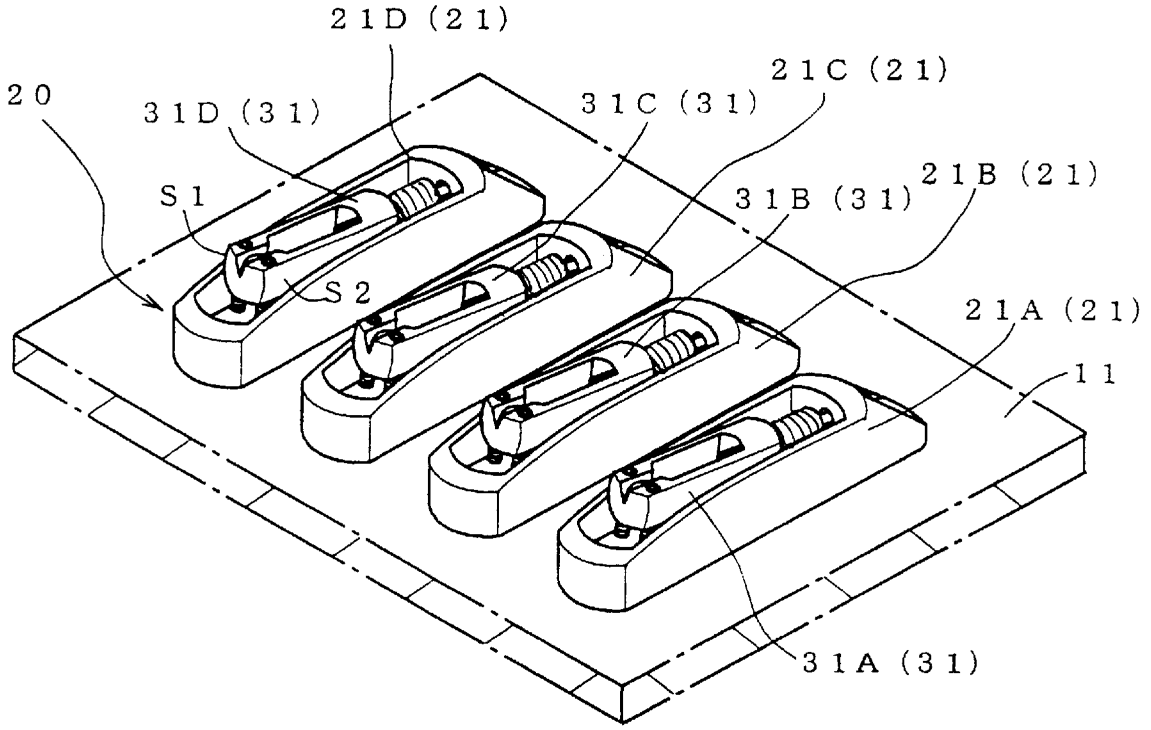
FIG. 2 is an oblique view of a guitar bridge according to the present invention.
Figure 3:
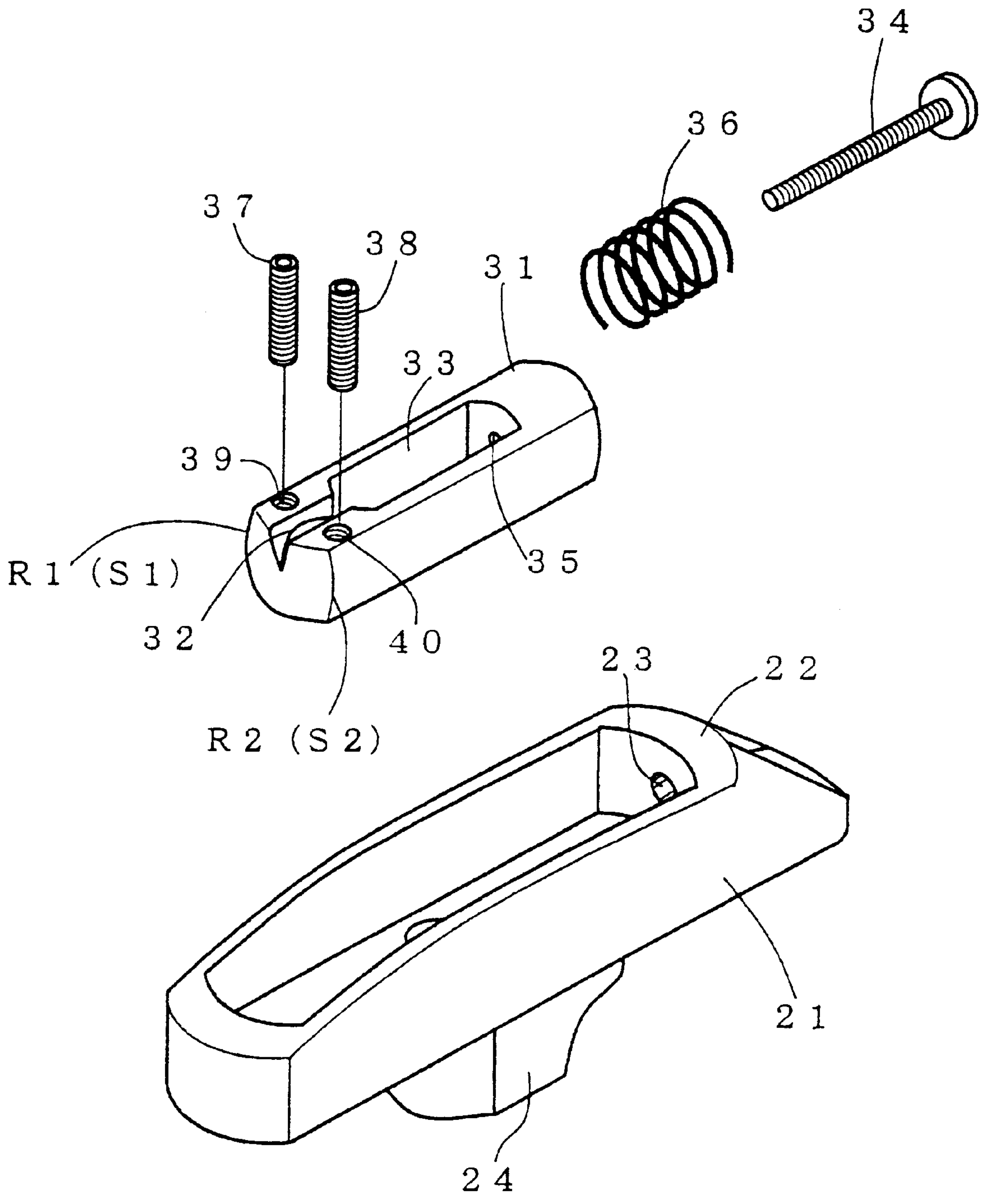
FIG. 3 is an oblique exploded view of an individual guitar bridge according to the present invention.

In the guitar shown in FIG. 1 according to the present invention, a plurality (four are shown) of guitar strings W1 through W4 (W) are held by a guitar bridge 20 at one end. Bridge 20 is arranged on a guitar body 11. Each string is wound on a respective tuning bolt or peg 16 of a neck 15 at the other end of the string. The structure of the guitar bridge 20 is explained below.

The guitar bridge 20 holds and fixes each guitar string W such that the string height and the string length of each string W can be finely adjusted. As shown in FIGS. 2 through 6, the bridge 20 is equipped with bridge main bodies 21A through 21D (21) and saddles 31A through 31D (31).

Figure 4:
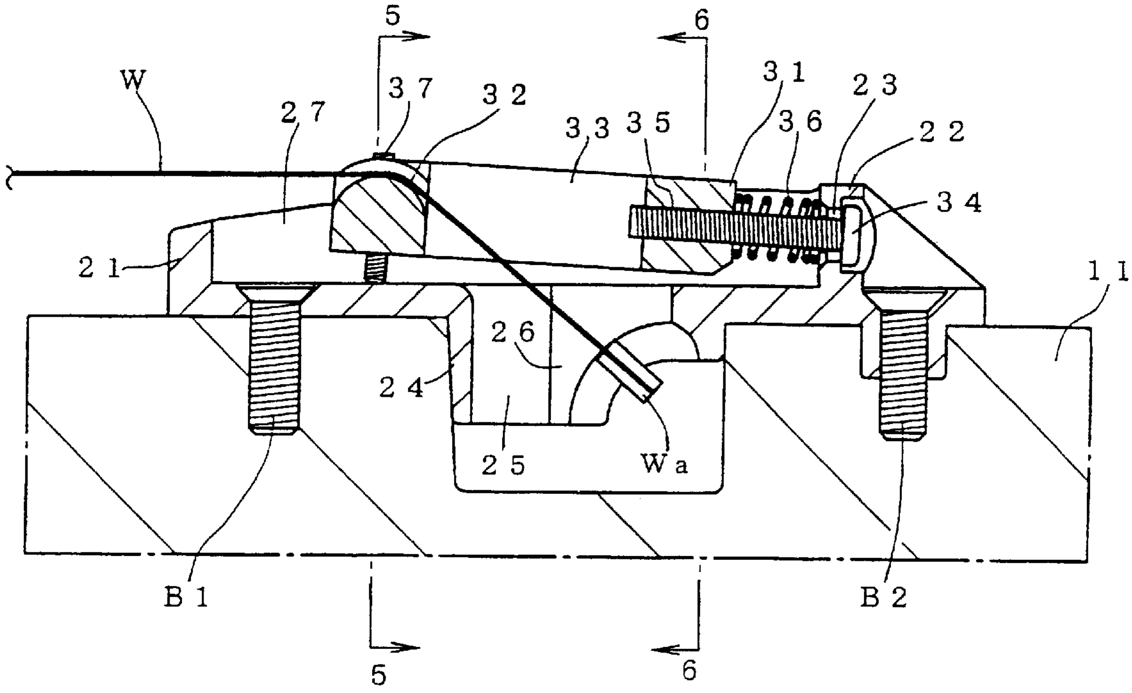
FIG. 4 is an elevational cross section showing guitar strings held by the guitar bridge of FIG. 3.
Figure 5:
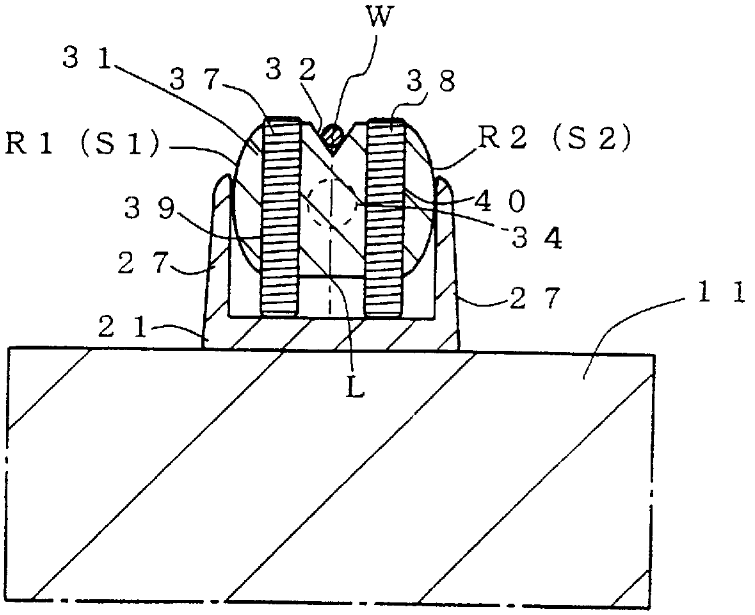
FIG. 5 is a cross section taken along line 5—5 in FIG. 4.

The guitar bridge 20 in this example comprises a set of individual bridges which is an arrangement selected for its external appearance. The separated bridge main bodies 21A through 21D and the respective saddles 31A through 31D are arranged individually and independently respectively for each of the guitar strings W1 through W4. The bridge main bodies 21 are made of a metal. As shown in FIG. 4, the bridge bodies 21 are all fixed to guitar body 11 by installation screws B1 and B2.

At the rear part of each bridge main body 21, there is a screw holder 22 which includes an opening 23 for receiving a screw. The diameter of the opening 23 is selected so as not to hinder front and back movement of the adjusting screw 34 or accompanying up and down movement of the saddle 31, as described below.

Figure 6:
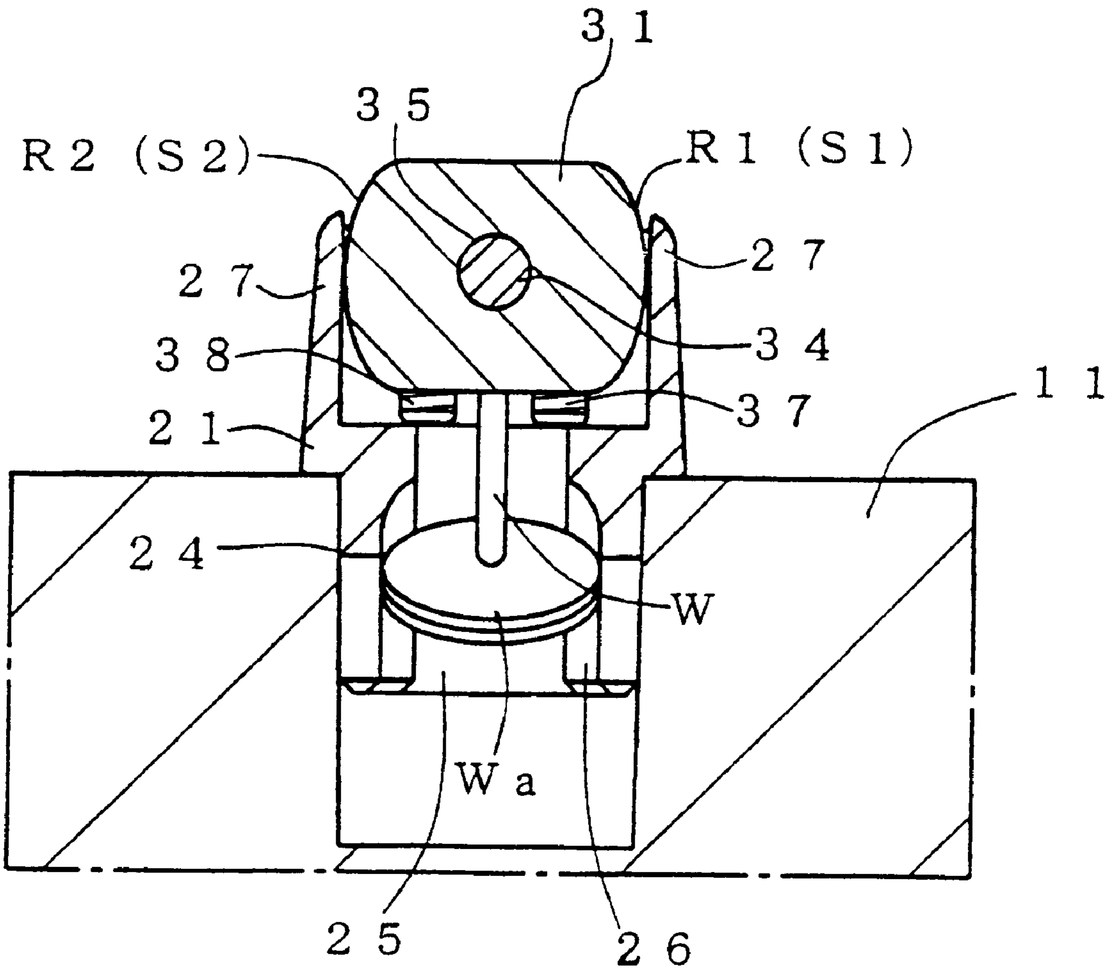
FIG. 6 is a cross section taken along line 6—6 in FIG. 4.

Below the bridge main body 21, there is a depending part 24 for installation of a string. Referring to FIGS. 4 and 6, a string stopper Wa is provided at the bridge end of the guitar string W. A string insertion part 25 is provided on the depending part 24. A string engaging part 26 is also provided on the depending part 24. The end of the guitar string W is fixed by inserting its string stopper part Wa into the string insertion part 25, and through a slot to engage the string engaging part 26.

Opposed walls 27 on the laterally opposite sides of the bridge main body 21 are in constant contact with the convexly curved surfaces R1 and R2 on the opposite lateral sides S1 and S2 of the saddle 31, as described below. The height of the walls 27 is sufficient to extend over the up and down movement range of the saddle 31.

The saddle 31 is made of metal, for example, and is arranged on the respective bridge main body 21. Saddle 31 has a string receiver 32 for the corresponding guitar string W. The string receiver 32 is comprised of a groove shape with a curved surface. Moreover, the string receiver 32 is provided at the center in the lateral width direction of the front part of the saddle 31.

In addition, the saddle 31 has a forward and rearward directions adjusting screw 34 inserted into the rear portion of the saddle. Saddle 31 is held to the bridge main body 21 and is freely movable rearward and forward, through front and back adjusting screw 34. The front part of the saddle 31 is held to the bridge main body 21 in a manner permitting free up and down motion through adjusting screws 37 and 38, in a pair, at the right and at the left, that contact the upper surface of the bridge main body 21 at their lower ends. Threaded screw holes 39 and 40 receive and cause up and down adjusting motion by screws 37 and 38.

In this example, the central axis of the forward and rearward motion adjusting screw 34 is located at the center of the lateral width of the saddle 31, directly in line with the string receiver 32 on the bridge body. A threaded screw hole 35 in the saddle receives and causes forward and rearward adjusting motion by the screw 34. Coil spring 36 provides tension on the saddle 31 as it is held by the adjusting screw 34.

Both opposite outward sides S1 and S2 of the saddle 31 have vertically oriented but convexly curved surfaces R1 and R2. Each curved surface bulges in the width direction of the saddle 31. In particular, the curved surfaces R1 and R2 are each formed by an arc of a circle that has a center on a straight line L (see FIG. 5) that connects the string receiver 32 and the adjusting screw 34 in the up and down direction.

Moreover, the center of the arcs that form the curved parts R1 and R2 of sides S1 and S2 is situated on the central axis of the adjusting screw 34. The radius of each arc is equivalent to the distance from the central axis of the adjusting screw 34 to the wall 27 of the bridge main body 21. The curved faces R1 and R2 are mutually symmetrically shaped.

When the side surfaces S1 and S2 of the saddle 31 are comprised of the curved surfaces R1 and R2 as described above, the outside appearance (design) of the guitar bridge 20 is improved, in addition to reducing the shifting of the holding position of the guitar string W due to the tilting (inclining) of the saddle 31, as described below.

In the guitar bridge 20, to adjust the string length of each guitar string W, the forward and rearward adjusting screw 34 is rotated for adjusting the forward and rearward motion of the saddle 31. To adjust the string height of each guitar string W, on the other hand, the up and down adjusting screws 37 and 38 are rotated, to adjust the height of the saddle 31.

Figure 7A:
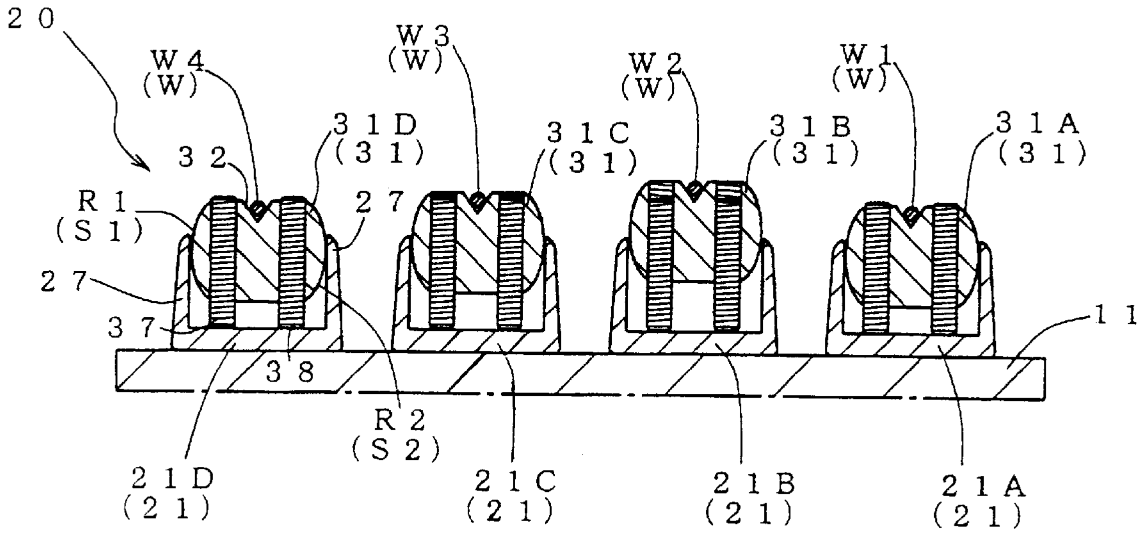
FIGS. 7A and 7B are cross sections showing string height adjusting states of each guitar string in a guitar bridge according to the present invention.
Figure 7B:
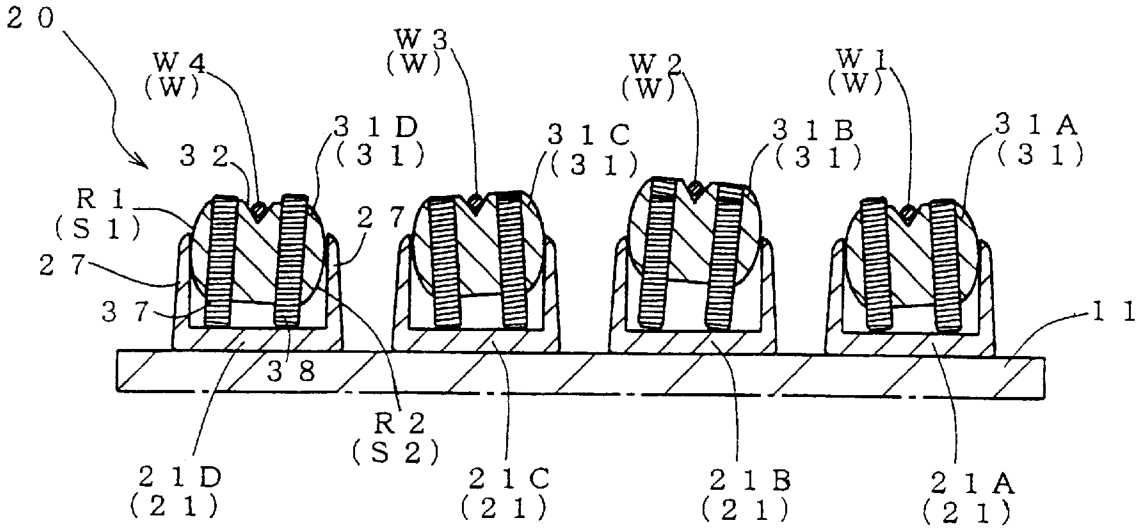

FIGS. 7A and 7B show the string height having already been adjusted for each guitar string W as described above. The respective two up and down adjusting screws 37 and 38 for each saddle have been adjusted so that their adjusted lengths are even, as shown in FIG. 7A. The saddle 31 is oriented horizontally, as compared with the bridge main body 21. In view of the absence of a shift in the holding position of each guitar string W1 through W4 or the position of the string receiver 32 of the saddle 31, the pitch or lateral spacing between any of the guitar strings will not change.

Nevertheless, it is not easy to adjust the lengths of the two up and down adjusting screws 37 and 38 to be even, as described above. The adjusted lengths of the two up and down adjusting screws 37 and 38 may be different, as shown in FIG. 7B. This tilts the respective saddle 31 around the longitudinal axis defined by the adjustment screw 34, with respect to the bridge main body 21 and the holding positions of the guitar strings W1 and W4 may laterally shift somewhat in the width or horizontal direction of the saddle 31.

Figure 13:
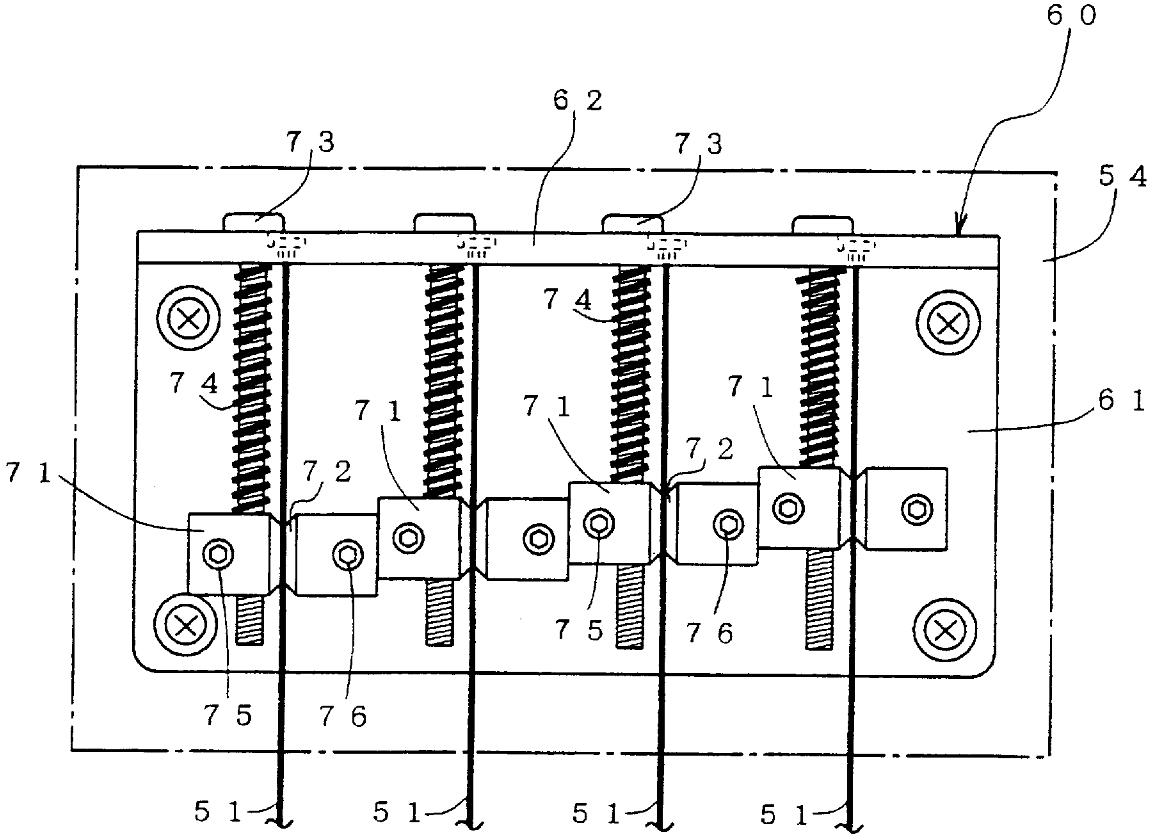
FIG. 13 is a plan view showing a guitar bridge according to the prior art.
Figure 14:
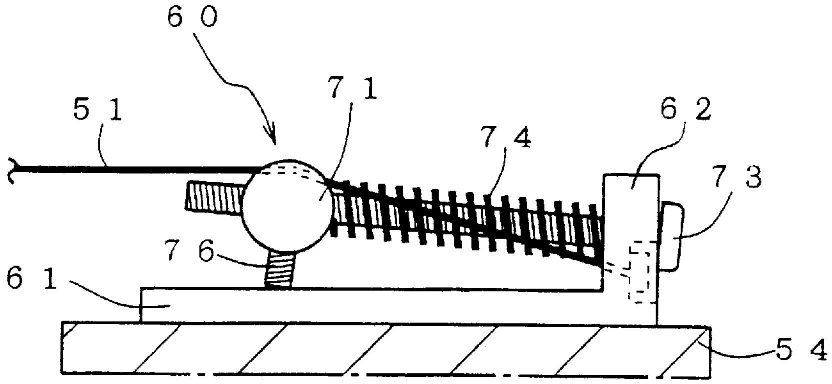
FIG. 14 is a side view of a prior art guitar bridge.
Figure 15A:
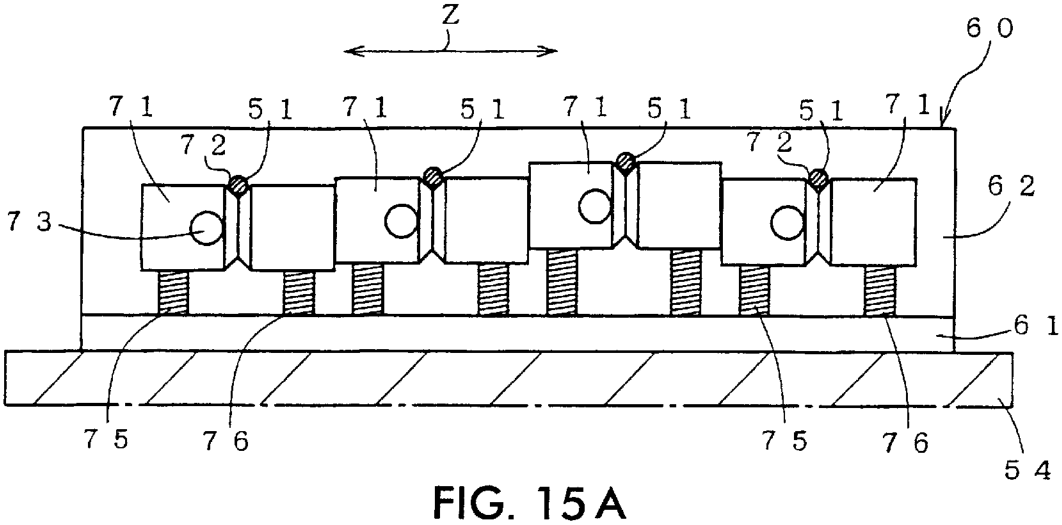
FIG. 15 is a front elevation view showing adjustment of the string height for each guitar string on the prior art guitar bridge.
Figure 15B:
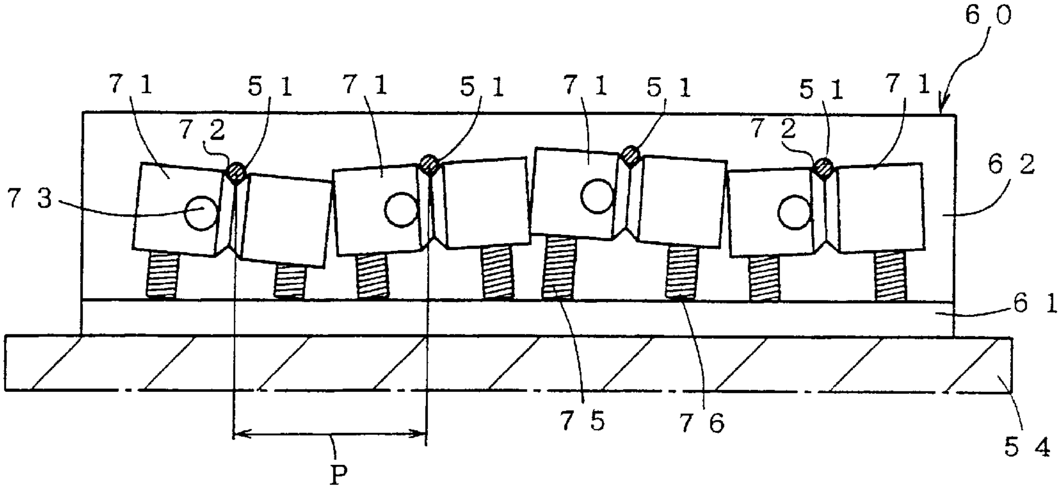
Figure 16:
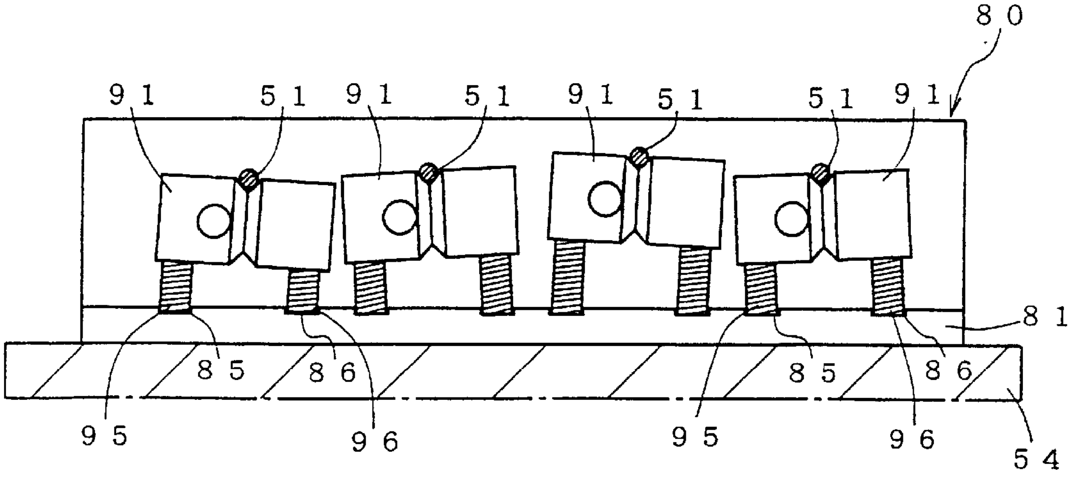
FIG. 16 is a front elevation view showing adjustment of the string height for each guitar string on the guitar bridge of another example of the prior art.

When the saddle 31 has been tilted, however, its curved surfaces R1 and R2 on the lateral sides S1 and S2 of the saddle 31 are constantly in touch with the walls 27 of the bridge main body. Accordingly, the saddle 31 may rotate, with the adjusting screw 34 as the axis, so that the shifts in the holding positions of the guitar strings W1 through W4 will become small, particularly as compared with the prior art guitar bridge 60 explained above in connection with FIGS. 13 through 15.

In addition, by providing the sides S1 and S2 of the saddle 31 with curved surfaces R1 and R2 and by replacing the tilting of the saddle 31 with rotary movement using the adjusting screw 34 as the axis, as described above, the up and down movement of the saddle 31 becomes smooth, as compared with the side of the saddle 31 being a flat surface. At the same time, there is an increase in the critical adjustment of one of the up and down adjustment screws 37 and 38, i.e., the adjustment length when the top of the side of the saddle 31 contacts the wall of the bridge main body 21, thereby making it impossible for the saddle 31 to tilt. This improves the operability of the string height adjustment of the guitar string W.

Another example of this invention is now explained. The guitar bridge 20X shown in FIGS. 8 and 9 has generally drum shaped saddles 31E through 31H (31X) each corresponding to one of the guitar strings W1 through W4 (W). The saddles are disposed on a single bridge main body 21X which supports all of the saddles. The body has a cross section that is approximately L shaped, and the saddles are arranged laterally side by side in a plurality, four in the example in FIG. 8.

At the rear of the bridge main body 21X, the screw holder 22X has respective openings 23E through 23H (23X) for the forward and rearward saddle motion adjusting screws at positions that correspond to the guitar strings W1 through W4, but which do not overlap the lateral positions of the guitar strings W1 through W4.

Installation screws B3–B6 fix the bridge main body 21X to the guitar body 11X. String insertion part 25X is formed at the screw holder 22X. A string engaging part 26X is formed at the screw holder 22X. The string stopper Wa provided at the end of each guitar string engages the respective string engaging part 26X, making it possible to secure one end of each guitar string W.

The saddles 31E through 31H (31X) are arranged individually and independently on the single bridge main body 21X, and each saddle corresponds to one guitar strings W1 through W4 (W). Like the saddles 30 in the example in FIGS. 2 through 7, the saddles 31X each have a string receiver for each guitar string W which is comprised of a groove having a curved surface. In this example, the groove is at approximately the center in the width direction of the saddle. The saddles are held by the bridge main body 21X so as to be freely movable forward and rearward and up and down. The forward and rearward adjusting screw 34X is inserted into the opening 23X at the screw holder 22X of the bridge main body 21X. The two up and down adjustment screws 37X and 38X are screwed into the saddle 31X and contact the bridge body. Both lateral sides S3 and S4 of each saddle 31X are comprised of curved surfaces R2 and R4 that are oriented vertically.

In this example, the curved surfaces R3 and R4 are each formed by an arc of a circle having its center along the central axis of the forward and rearward adjusting screw 34X. The central axis of the screw 34X is shifted to one lateral side (to the left side in the drawing) off the center of the width direction of the saddle 31X, such that the radius of the arc that forms the curved surface R3 of the left-side surface S3 is smaller than the radius of the arc that forms the curved surface R4 of the right-side surface S4. A coil spring 36X biases against the saddle 31X. The tension of the spring is adjusted by the front and back adjustment screw 34X.

In the guitar bridge 20X, the length of the guitar string W is adjusted by rotating the front and back adjusting screw 34X, such that the screw length is changed relative to the saddle 31X. Thus, it is possible to adjust the front to back position of the saddle 31X, as with the guitar bridge 20 in the earlier example.

Figure 9A:
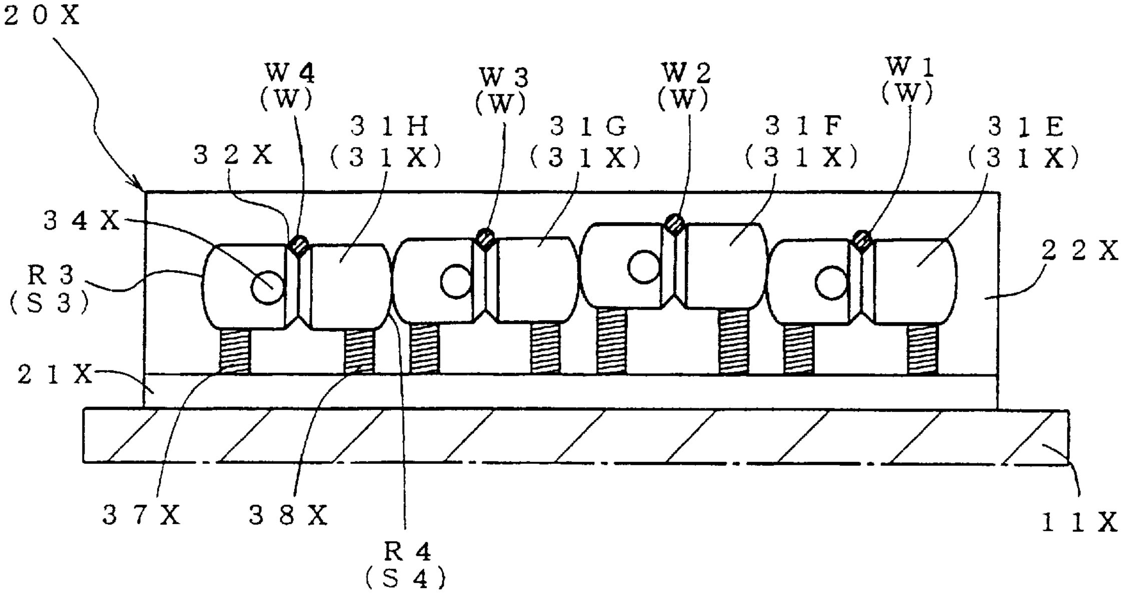
FIGS. 9A and 9B are front elevation views showing string height adjustment for each guitar string in a guitar bridge of the present invention.
Figure 9B:
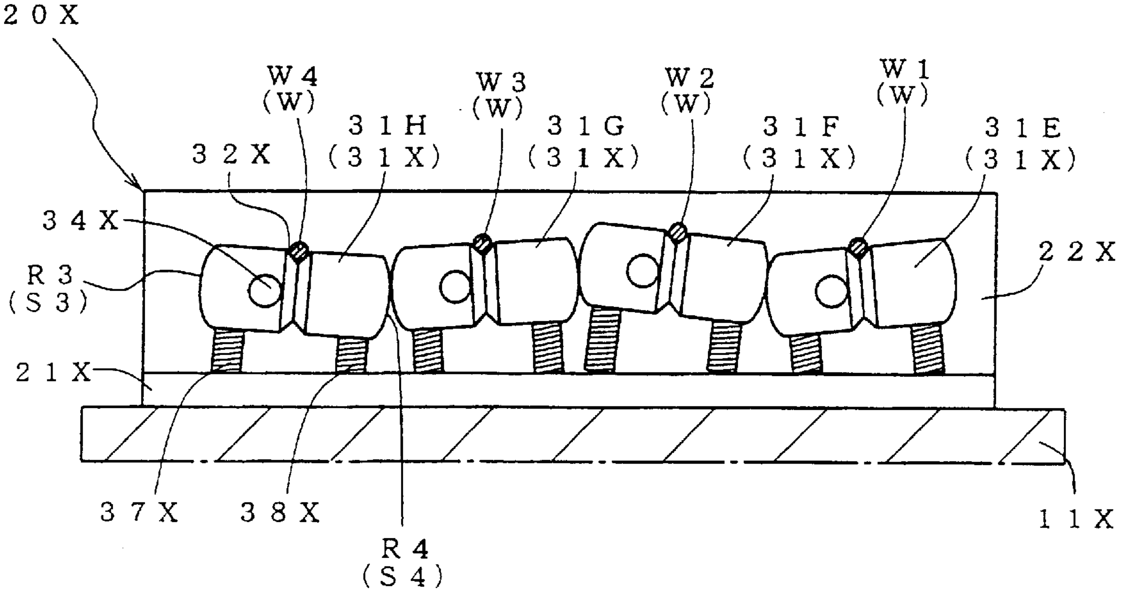

When the string height of the guitar string W is to be adjusted, up and down adjustment screws 37X and 38X are rotated, which adjusts the height of the saddle 31X. In adjusting the string height of each of the guitar strings W, unless the adjustment lengths of the two up and down adjustment screws 37X and 38X of a saddle are the same, as shown in FIG. 9A, the saddle 31X tilts or inclines. As shown in FIG. 9B, however, that tilting is replaced by a rotary movement around the forward and rearward adjustment screw 34X as its axis. This reduces interference against the neighboring saddles 31X even when the saddles 31X tilt. Accordingly, the shift in the holding position of each guitar string W1 through W4 becomes, small as compared with the guitar bridge 60 of the prior art which was explained in connection with FIGS. 13 through 15.

Figure 10:
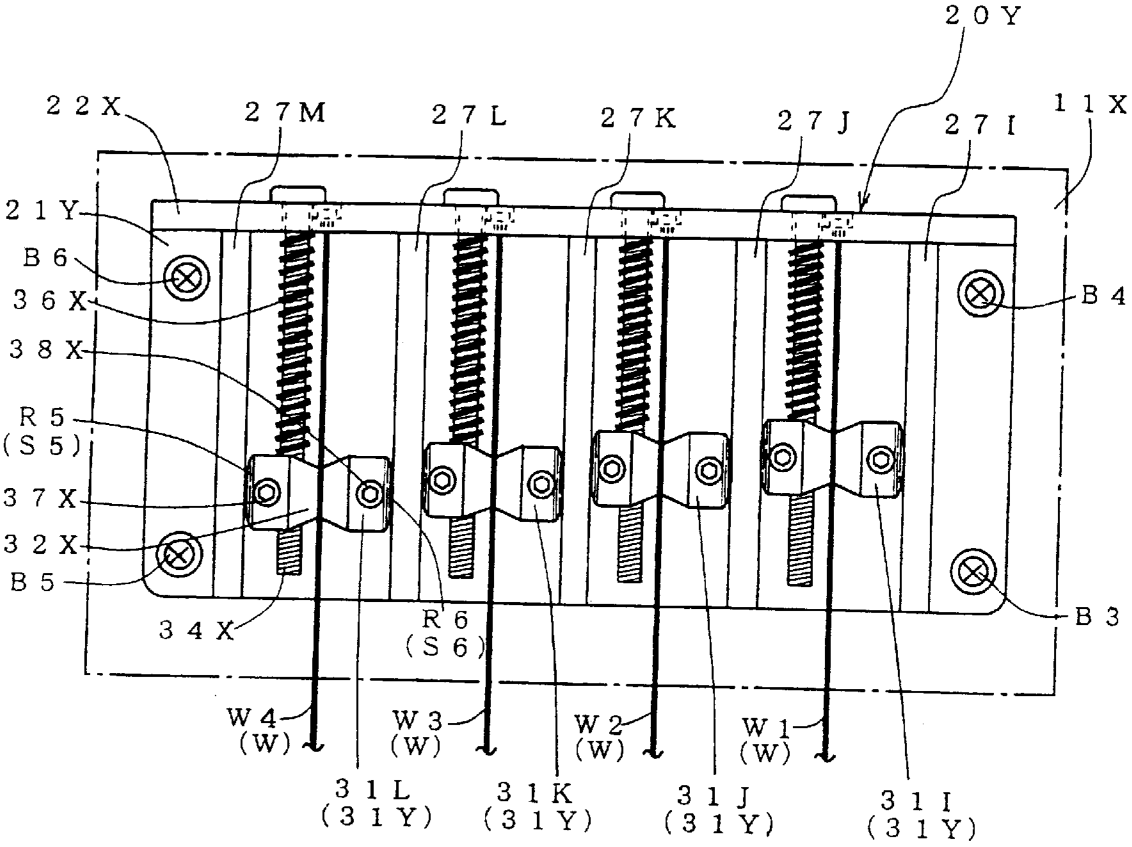
FIG. 10 is a plan view of a guitar bridge according to still another embodiment of the present invention.

A further example of the present invention is explained. In the guitar bridge 20Y shown in FIGS. 10 and 11, there are a plurality of four drum shaped saddles 31I through 31L corresponding to the guitar strings W1 through W4 (W) and arranged on a bridge main body 21Y having an approximately L-shaped cross section. The guitar bridge 20Y is approximately the same as the guitar bridge 20X in the embodiment of FIGS. 8 and 9. Therefore, elements which are the same as described above have the same reference numbers and are not again explained. The parts of this guitar bridge 20Y, which are different from the bridge 20X, are explained below.

In the guitar bridge 20Y, there are walls 27I through 27M upstanding on the bridge body which constantly contact the curved surfaces R5 and R6 on the sides S5 and S6 of the saddles 31I through 31L (31Y) on the bridge main body 21Y. The height of these walls 27I through 27M is sufficient to cover the up and down movable range of the saddle member 31Y. In addition, the curved surfaces R5 and R6 that constitute the sides S5 and S6 of the saddle 31Y have a spherically curved arcuate surface with its center on the central axis of the front and back adjusting screw 34X.

Figure 11A:
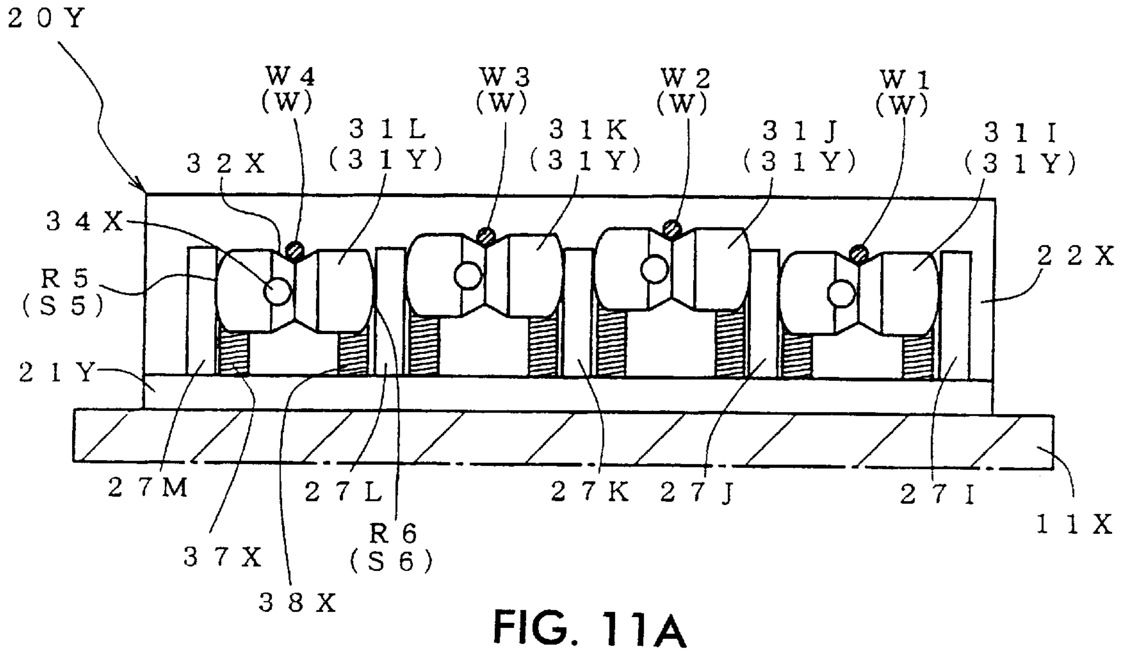
FIGS. 11A and 11B are front elevation views showing string height (action) adjustment of each guitar string in the guitar bridge of FIG. 10.
Figure 11B:
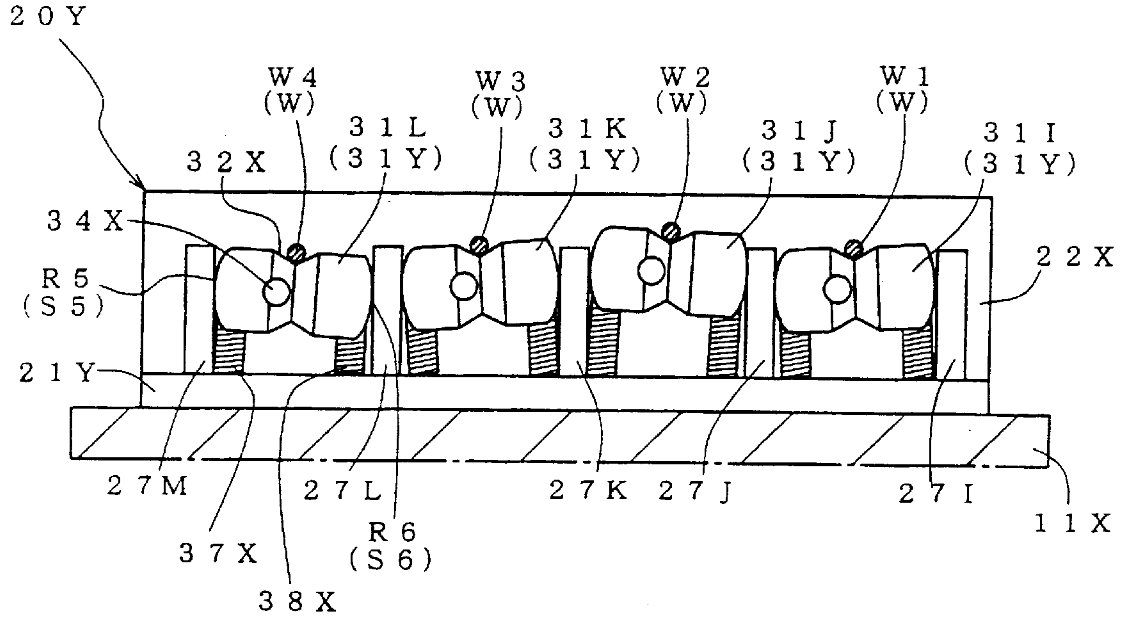
Figure 12:
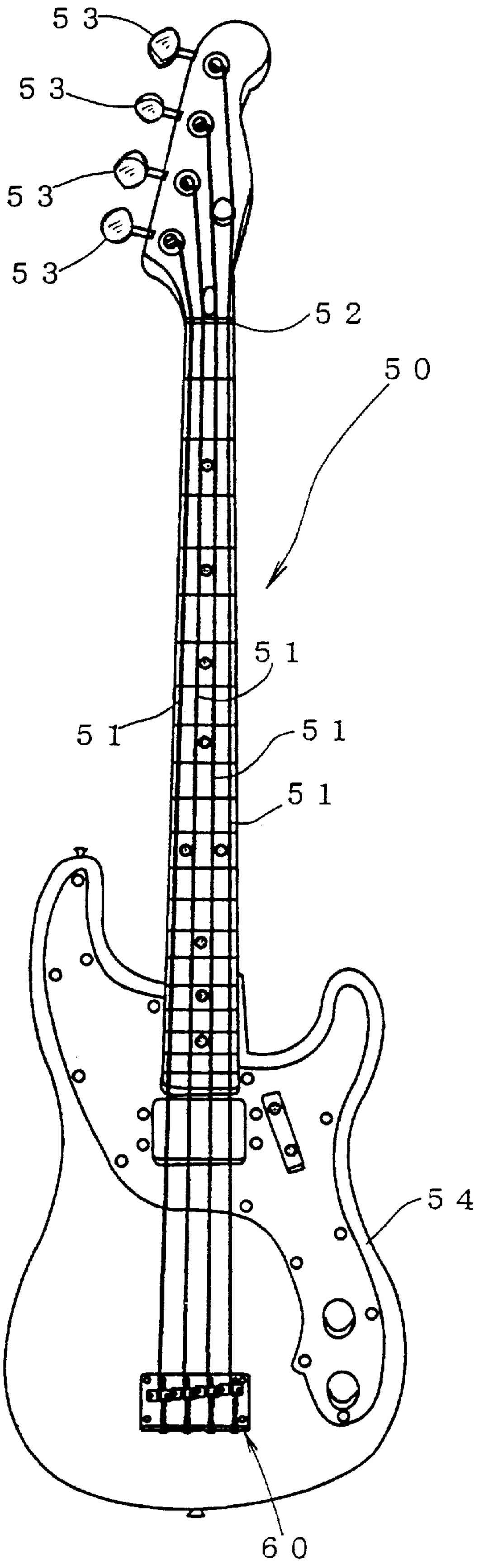
FIG. 12 is a plan view showing an entire prior art guitar.

Accordingly, tilting of each saddle 31Y is replaced by rotary movement, with the front and back adjusting screw 34X as the axis, as in the case of the previous example, even when the saddles 31I through 31L (31Y) tilt due to unequal adjusted lengths of the up and down adjustment screws 37X and 38X, as shown in FIG. 11B. Moreover, the walls on make it possible to completely eliminate mutual interference between neighboring saddles 31Y because the walls on the bridge main body 21Y extend between the adjoining saddles 31Y.

Figure 8:
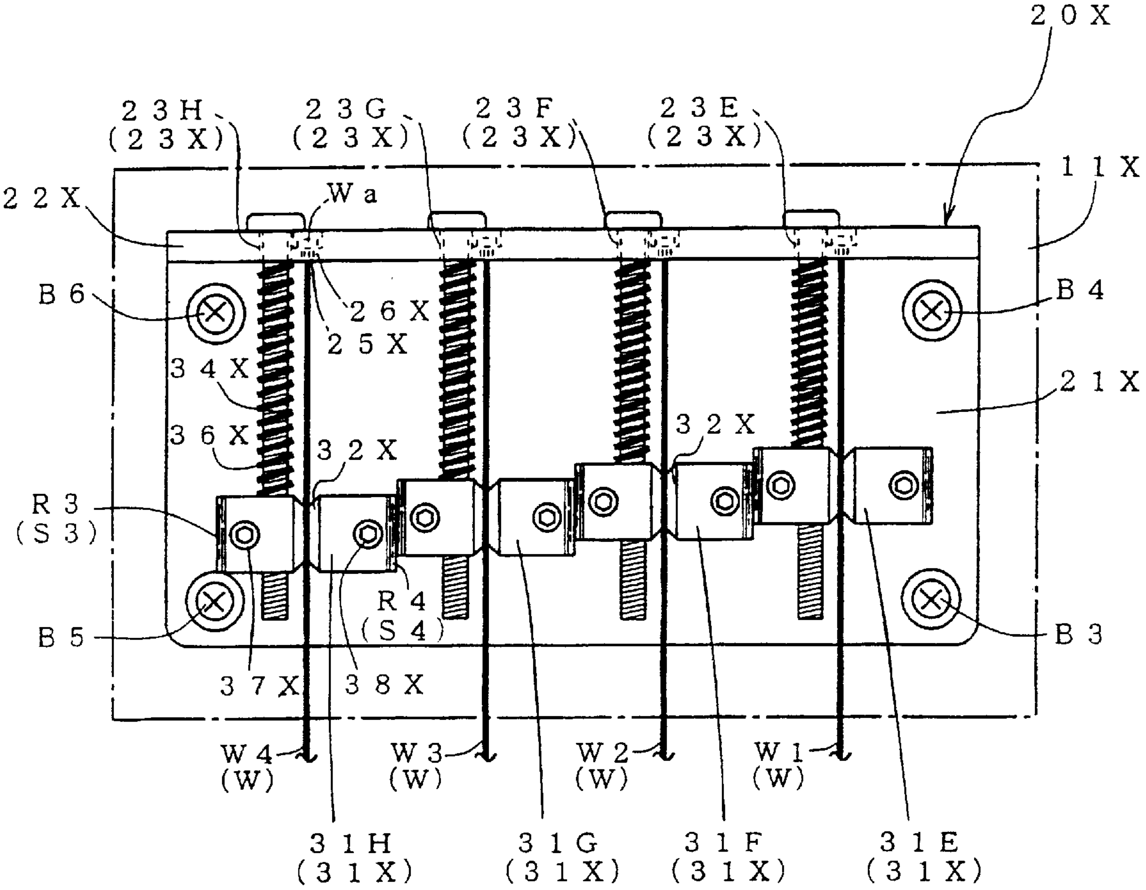
FIG. 8 is a plan view of a guitar bridge according to another embodiment of the present invention.

The alternative embodiments of the present invention are now compared, upon an adjustment so that the heights of the saddles 31E through 31H are different in connection with the guitar bridge 20X shown in FIGS. 8 and 9. Further, the contact positions (heights) of the adjacent saddles change. On the other hand, with the guitar bridge 20Y shown in FIGS. 10 and 11, the contact positions (heights) between the saddles 31I through 31L and walls 27I through 27M constantly remain the same, even if the adjustment is carried out such that the heights of the saddles 31I through 31L are different. Accordingly, it becomes possible to further reduce the shifting of the holding positions of the guitar strings W1 through W4.

FIG. 11A shows the case where the up and down adjustment screws 37X and 38X have been so adjusted that their adjusted lengths are even.

According to this invention, as explained above, by providing the side of each saddle with a curved side surface, the shift in the holding position of the guitar strings caused by the tilting of the saddle as a result of string height adjustment is reduced, as compared with the known prior art, thereby making it possible to prevent any adverse effect on the guitar's performance caused by a change in the pitch among the strings of the guitar.

By providing a curved surface on the side of a saddle formed by an arc of a circle having its center on a straight line that connects the string receiver of the saddle and the front and back adjusting screw in the up and down direction, a further reduction is achieved in shifting of the holding position of the guitar string caused by the tilting of the saddle at the time of an adjustment of the string height.

Providing a bridge main body having a side that is in constant contact with the curved surface on the side of the saddle member, moreover, makes it possible to completely prevent interference between adjoining saddles, thereby making it possible to further reduce the shifting of the holding position of the guitar strings due to tilting of a saddle when a string height is adjusted.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A guitar bridge for a plurality of guitar strings arrayed across the width of a guitar body, and the strings extend along the length direction of the guitar body, the bridge comprising:

a main bridge body for each of the strings;

a respective string receiver in the bridge main body for each of the strings;

a respective saddle for each of the strings, the saddle being supported on the main bridge body;

the saddle including a part positioned for the respective string to pass over the saddle along its path to the respective string receiver on the main bridge body;

the saddle having two opposite lateral sides with respect to the width direction of the guitar, at least one of the lateral sides of the saddle is curved convexly in the up and down direction of the guitar body;

a first pivot support for the saddle on the main bridge body for supporting the saddle to pivot around an axis generally along the length direction of the guitar body;

a second support which is adjustable for moving the saddle forward and rearward along the guitar body; and a saddle height adjustment device for raising and lowering the saddle with respect to the guitar body and also for pivoting the saddle around the axis.

2. The guitar bridge of claim 1, wherein the first the second supports both comprise a first screw held in the main bridge body and received in the saddle such that rotation of the screw moves the saddle forward and rearward along the guitar body and such that saddle may be pivoted around the first screw.

3. The guitar bridge of claim 2, wherein the bridge main body and the saddle are connected such that the saddle may be raised and lowered with respect to the guitar body while the first screw extends from the bridge main body to the saddle and permits the raising and lowering of the saddle.

4. The guitar bridge of claim 2, wherein the saddle height adjustment device comprises at least one second screw in the saddle and in contact with the guitar body for being adjusted for raising and lowering the saddle.

5. The guitar bridge of claim 4, wherein the saddle height adjustment device comprises two of the second screws in the saddle spaced apart along the width direction, and adjustment of the two screws determines the pivot orientation of the saddle with respect to the bridge main body and the guitar body.

6. The guitar bridge of claim 1, in which the curved surface on the side of the saddle is formed by an arc portion of a circle having its center on a straight line that connects the string receiver on the saddle and the longitudinal pivot of the saddle.

7. The guitar bridge of claim 1, wherein the bridge main body has a wall that is constantly in contact with the curved side of the saddle.

8. The guitar bridge of claim 1, wherein the curved side of the saddle is shaped to allow pivoting of the saddle about the longitudinal axis.

9. The guitar bridge of claim 1, wherein the bridge main body includes a respective separate one of the bodies for each saddle.

10. The guitar bridge of claim 9, wherein the bridge main body has a wall that is constantly in contact with the curved side of the saddle.

11. The guitar bridge of claim 1, wherein the bridge main body comprises a single body extending across the width of the guitar body for a plurality of the saddles.

12. The guitar bridge of claim 11, wherein the bridge main body has a respective wall that is constantly in contact with the curved side of each saddle.

* * * * *